Oct. 8, 1968
T. L. FAWICK
3,404,544
FLEXIBLE COUPLING
Filed Feb. 3, 1967
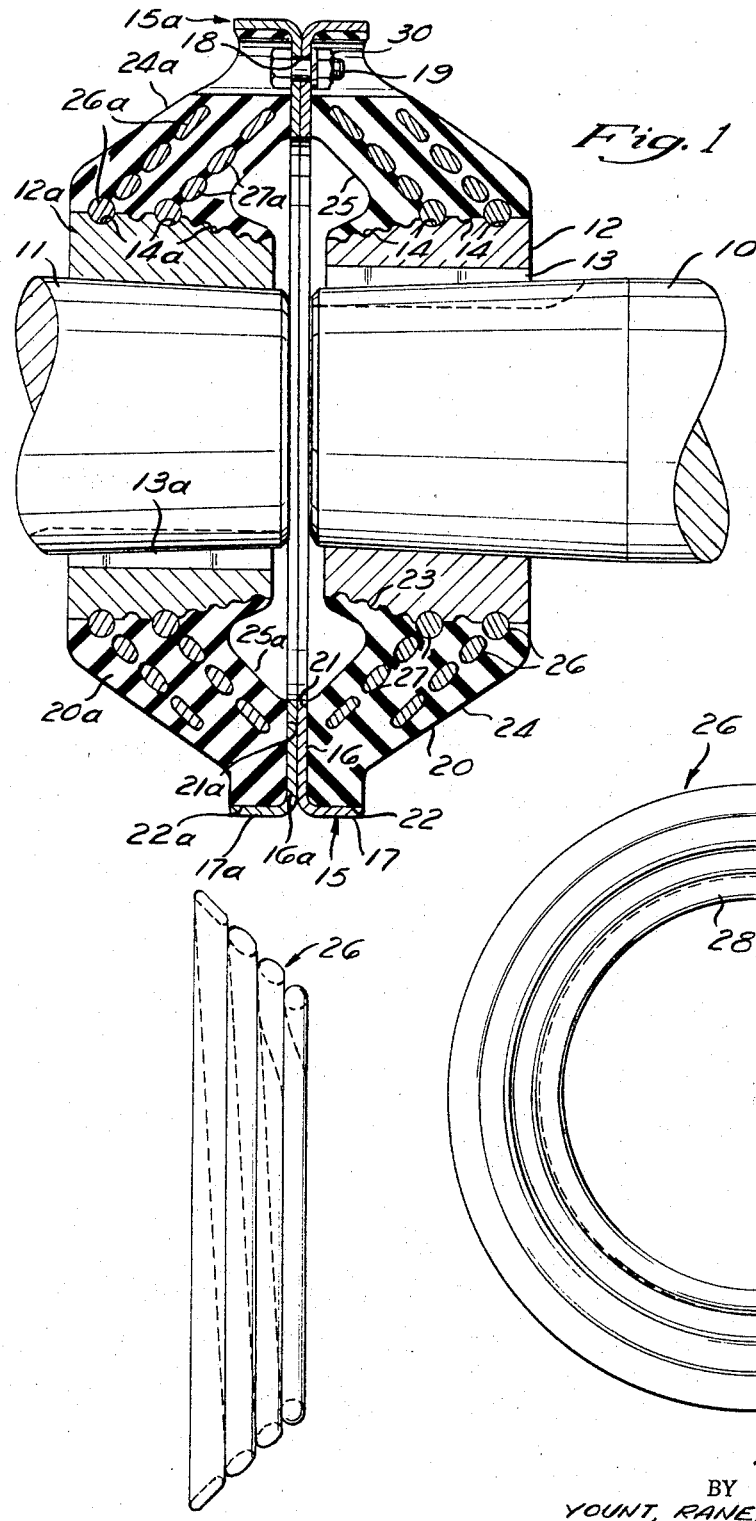
INVENTOR.
THOMAS L. FAWICK
BY
YOUNT, RANEY, FLYNN, & TAROLLI
ATTORNEYS United States Patent Office 3,404,544
Patented Oct. 8, 1968

3,404,544
FLEXIBLE COUPLING
Thomas L. Fawick, Shaker Heights, Ohio
(% Hotel Statler-Hilton, Cleveland, Ohio 44101)
Filed Feb. 3, 1967, Ser. No. 613,779
15 Claims. (Cl. 64—11)

ABSTRACT OF THE DISCLOSURE

A flexible coupling has outer and inner coupling bodies, an annular body of rubber-like material engaged between them, and oppositely wound spiral springs embedded in the rubber-like body. The innermost turn of each spring is vulcanized to the inner coupling body at a circumferential groove on the latter and is radially expanded by its engagement there. Each spring is progressively more oblong in cross-section along its length outward from the inner coupling body.

---

This invention relates to a flexible coupling for transmitting torque between two relatively rotatable structures, such as two shafts, which are in approximate axial alignment.

A principal object of this invention is to provide a novel and improved flexible coupling which has an improved torque capacity for its size and is capable of accommodating appreciable angular and parallel misalignment between the driving and driven structures.

Another object of this invention is to provide a novel and improved flexible coupling having an annular body of rubber-like material for transmitting torque between inner and outer coupling bodies and reinforced by a novel spring arrangement which improves its torque capacity while at the same time permitting the coupling to accommodate appreciable angular and parallel misalignment of the driving and driven structures.

Another object of this invention is to provide such a coupling in which the spring has a cross-sectional shape which enables an improved bonding to the rubber-like material in the coupling.

Another object of this invention is to provide such a coupling having a secure attachment of the inside turn of the reinforcing spring to the inner coupling body.

Further objects and advantages of this invention will be apparent from the following detailed description of a presently-preferred embodiment, which is illustrated in the accompanying drawing.

In the drawing:

FIGURE 1 is an axial section through a flexible coupling assembly embodying the present invention;

FIGURE 2 is a side view of one of the reinforcing springs in the FIG. 1 coupling assembly; and FIGURE 3 is an end view of this spring.

Referring to FIG. 1, the coupling assembly is shown acting between a pair of relatively rotatable structures, such as shafts 10 and 11, which are positioned in approximate axial alignment. Either shaft 10 or 11 may be the driving shaft and the other may be the driven shaft, and the two shafts may have appreciable angular and parallel (or axial) misalignment.

In the embodiment illustrated, the complete coupling assembly is made up of two similar couplings, one on each shaft, which are bolted together end-to-end.

The first coupling in this assembly comprises a rigid, annular, inner coupling body 12 of suitable metal which is mounted on the inner end of shaft 10 by a key member 13 or in any other suitable fashion. The inner coupling body has a plurality of circumferentially extending recesses 14 spaced apart axially on its outer periphery.

The first coupling also comprises a rigid, annular, outer coupling body 15 of suitable metal which presents a radially disposed, annular, inner end wall 16 and a circumferential, longitudinally extending flange 17 formed integral with this end wall and extending perpendicular to it. The end wall 16 has a plurality of circumferentially spaced openings 18 for receiving respective bolts 19 to attach this outer coupling body 15 to a similar outer coupling body on the other half of the coupling assembly, as described hereinafter.

The first coupling has an annular body 20 of rubber or rubber-like material engaged between the inner coupling body 12 and the outer coupling body 15 to provide a flexible and resilient torque-transmitting connection between them. This rubber-like body 20 has its axially inward end face 21 vulcanized to the inside of the end wall 16 on the outer coupling body 15, its radially outward peripheral face 22 vulcanized to the inside of the flange 17 on the outer coupling body, and its inside periphery 23 filling the grooves 14 on the inner coupling body 12 and vulcanized to the periphery of this body over its complete extent longitudinally and circumferentially. The rubber-like body 20 presents annular outer and inner end faces 24 and 25, respectively, which are both inclined axially inward in a direction laterally outward from the inner coupling body 12, so that the rubber-like body 20 has a general inclination in this direction.

In accordance with the preferred embodiment of the present invention, a pair of longitudinally spaced, oppositely-wound, identical spiral springs 26 and 27 are embedded in, and vulcanized to, the rubber-like material of the body 20 to reinforce the latter so as to provide higher torque capacity in either direction of rotation of the coupling. Referring to FIGS. 2 and 3, each of these springs has interconnected turns of progressively increasing radius which progress laterally outward. The successive turns are offset axially from one another in the direction in which the rubber-like body 20 is inclined, as shown in FIG. 1.

The innermost turn 28 of the first spring 26 is seated in one of the circumferential grooves 14 on the periphery of the inner coupling body 12 and it is expanded radially by such seating engagement, so that it has a tight fit on the inner coupling body. Preferably, the spring is provided initially with a thin coating of rubber-like material which enables it to be vulcanized to the inner coupling body 12 when the rubber-like material of the annular body 20 is poured into the mold between the outer and inner coupling bodies 15 and 12 to become vulcanized to these bodies and to the springs 26 and 27. The vulcanized attachment of the innermost turn 28 of spring 26 to the inner coupling body provides a secure anchor for the inner end of this spring so that rotation of the coupling in one direction tends to wind up the spring more tightly, and the resistance which the spring presents to such deformation provides a reinforcement for the rubber-like body 20 as it transmits torque between the outer and inner coupling bodies 15 and 12.

If desired, however, the innermost turn of the spring 26 may be suitably anchored to the inner coupling body 12 other than by vulcanized adhesion, such as by welding.

As shown, the spring 26 has a circular cross-section at its inner end and it becomes progressively more oblong in cross-section along its spiral length outward, with a greater cross-section laterally of the coupling than axially of the coupling. Preferably, the oblong cross-section is such that the spring wire has its maximum cross-sectional dimension in the direction in which the spring as a whole is inclined laterally, and its minimum cross-sectional dimension perpendicular to that direction of inclination.

The second spring 27 is attached to the inner coupling body 12 in the same manner as the first spring and it extends generally parallel to the first spring.

The outer ends of both springs 26 and 27 terminate within the rubber-like body 20 and are not directly attached to the outer coupling body 15.

As already stated, the two springs 26 and 27 embedded in the rubber-like body 20 are oppositely wound. Therefore, rotation of the coupling in one direction will tend to wind up more tightly a first one of these springs and not the other, whereas rotation of the coupling in the opposite direction will tend to wind up more tightly the other spring and not the first. In either situation, the spring which tends to be wound up more tightly acts as a reinforcement for the rubber-like body 20 to enhance its torque-transmitting capacity.

In the embodiment of FIG. 1, the complete coupling assembly has a second coupling which is mounted on the second shaft 11 and is a mirror image of the first coupling. Corresponding elements of the second coupling have the same reference numerals, with an *a* suffix added, as the elements of the first coupling, and the description of these elements will not be repeated.

The first and second couplings are rigidly attached together by positioning them end-to-end, with the end walls 16 and 16a of the outer coupling bodies 15 and 15a abutting against each other, and clamping them in this position by means of the bolts 19 and cooperating nuts 30.

In the operation of this coupling assembly, either shaft 10 or 11 may be the driving shaft and the other the driven shaft, and the direction of rotation may be in either direction. The springs reinforce the couplings, as described, and thereby increase the torque capacity of the assembly without detracting appreciably from its ability to accommodate either angular misalignment or parallel misalignment, or both, of the two shafts 10 and 11. This is because each spring does not present an excessive restraint against the relative displacement between its several turns which would be involved in either angular or parallel misalignment of the driving and driven shafts. That is, while the spring is conformed to provide maximum resistance against torsional deformation so as to increase the torque capacity of the coupling, as described, it does not provide excessive resistance against the deformation which it must undergo to accommodate either angular or parallel misalignment of the shafts. Due to the axially offset positioning of adjacent turns of the spring, each turn can be displaced an appreciable amount with respect to adjacent turns without interference between them to accommodate parallel or angular misalignment of the shafts. Consequently, the spring as a whole is capable of greater deformation under such parallel or angular misalignment than would be the case if its turns were all in substantially the same radial plane.

The progressively more oblong cross-section of each reinforcing spring provides a larger bonding area, and therefore, a more secure bond, between the spring and the rubber-like material of the body 20 or 20a along the length of the spring toward its outer end.

For certain practical applications, the dual coupling assembly shown in FIG. 1 is not necessary and the complete coupling may have only one of the two couplings shown there, consisting of the inner coupling body 12, the outer coupling body 15, the rubber-like body 20, and the reinforcing springs 26, 27. Also, if the rotation of the coupling will be in one direction only, one of the reinforcing springs may be omitted, leaving only the spring which tends to be wound up more tightly by the torque on the coupling in that direction.

If desired, instead of being progressively more oblong outward along its spiral length, as described, the reinforcing spring may have an oblong cross-section which is uniform throughout its entire spiral length, preferably with a cross-sectional dimension laterally of the coupling which is appreciably less than its cross-sectional dimension axially of the coupling.

Accordingly, while a particular presently-preferred embodiment of this invention has been described in detail and illustrated in the accompanying drawing, it is to be understood that the invention is susceptible of other embodiments and that various modifications, omissions and refinements which depart from the disclosed embodiment may be adopted without departing from the spirit and scope of the present invention.

I claim:
1. A flexible coupling comprising:
an annular inner coupling body;
an annular outer coupling body spaced laterally outward from said inner body;
an annular body of rubber-like material engaged between said inner and outer coupling bodies;
and a pair of axially spaced, oppositely-wound spiral springs embedded in and bonded to said body of rubber-like material, each of said springs presenting interconnected turns progressing in succession laterally outward from said inner coupling body, each of said springs being attached to one of said coupling bodies.

2. A flexible coupling according to claim 1, wherein the successive turns of each spring are axially offset from one another.

3. A flexible coupling according to claim 2, wherein at least certain of the turns of each spring have an oblong cross-section, with a greater cross-sectional dimension laterally than longitudinally of the coupling.

4. A flexible coupling according to claim 3, wherein each spring is progressively more oblong in cross-section along its spiral length outward from the inner coupling body.

5. A flexible coupling according to claim 1, wherein each of said springs is attached to the inner coupling body at its innermost turn.

6. A flexible coupling according to claim 5, wherein the successive turns of each spring are axially offset from each other.

7. A flexible coupling according to claim 5, wherein said inner coupling body has circumferentially extending recesses on its periphery, each of said springs has its innermost turn seated in one of said recesses and is expanded laterally outward by its engagement thereat with the inner coupling body, and the innermost turn of each spring is attached to the inner coupling body at the respective recess.

8. A flexible coupling according to claim 6, wherein at least certain of the turns of each spring are oblong in cross-section, with a greater cross-sectional dimension laterally of the coupling than axially thereof.

9. In a flexible coupling having outer and inner coupling bodies, and an annular body of rubber-like material engaged between said outer and inner coupling bodies, the improvement which comprises:
said inner coupling body having a circumferential recess on its periphery, and a spiral spring embedded in said body of rubber-like material and presenting interconnected turns progressing in succession laterally outward from said inner coupling body, said spring having its innermost turn received in said recess and attached to the inner coupling body thereat.

10. A flexible coupling according to claim 9, wherein said innermost turn of the spring is seated in said recess and is expanded outward by its engagement thereat with the inner coupling body and is attached rigidly to the latter.

11. In a flexible coupling having outer and inner coupling bodies, an annular body of rubber-like material engaged between said outer and inner coupling bodies, and a spiral spring embedded in said body of rubber-like material and presenting interconnected turns progressing in succession laterally outward from said inner coupling body, said spring being attached to one of said coupling bodies, the improvement wherein at least certain of the turns of said spring have a greater cross-sectional dimension laterally than axially of the coupling.

12. A flexible coupling according to claim 11, wherein said spring is progressively more oblong in cross-section along its length outward from the inner coupling body.

13. In a flexible coupling having outer and inner coupling bodies, an annular body of rubber-like material engaged between said outer and inner coupling bodies, and a spiral spring embedded in said body of rubber-like material and presenting interconnected turns progressing in succession laterally outward from said inner coupling body, said spring being attached to one of said coupling bodies, the improvement wherein the successive turns of the spring are axially offset from one another.

14. A flexible coupling according to claim 13, wherein at least certain of the turns of the spring have a greater cross-sectional dimension laterally than longitudinally of the coupling.

15. A flexible coupling according to claim 13, wherein the innermost turn of said spring is attached rigidly to said inner coupling body.

References Cited

UNITED STATES PATENTS

| | | | |
|---|---|---|---|
| 2,251,804 | 8/1941 | Reuter et al. | 64—11 |
| 2,536,216 | 1/1951 | Powell | 64—11 X |
| 2,995,907 | 8/1961 | Orain | 64—11 |

HALL C. COE, *Primary Examiner.*